United States Patent [19]

Kamoshita et al.

[11] Patent Number: 4,739,428
[45] Date of Patent: Apr. 19, 1988

[54] CLAMPING DEVICE FOR A HOLDER OF A DISC PLAYBACK DEVICE

[75] Inventors: Yasuhiko Kamoshita; Mikio Ogusu; Kazuo Urata, all of Hamamatsu, Japan

[73] Assignee: Nippon Gakki Seizo Kabushiki Kaisha, Hamamatsu, Japan

[21] Appl. No.: 866,142

[22] Filed: May 22, 1986

[30] Foreign Application Priority Data

May 29, 1985 [JP] Japan .................. 60-80616

[51] Int. Cl.⁴ .......................... G11B 5/012
[52] U.S. Cl. ................... 360/97; 369/75.2
[58] Field of Search .................. 360/97–99, 360/96.5; 369/75.2, 77.2

[56] References Cited

U.S. PATENT DOCUMENTS 4,570,194 2/1986 Schatteman .................. 360/97

Primary Examiner—A. J. Heinz
Attorney, Agent, or Firm—Spensley Horn Jubas & Lubitz

[57] ABSTRACT

In a disc playback device of a type in which a disc or a disc cartridge case housing a disc is loaded in a holder and the disc is played back upon moving of this holder from a disc loading position to a disc playback position, magnetic attraction generating means is provided for attracting the holder and a chassis carrying a turntable to each other. The magnetic attraction generating means may be constructed by securing a magnet to either the chassis or the holder and forming the other with magnetic substance, or may be constructed by securing magnets to both the chassis and the holder. The holder is securely clamped in position when it has been moved to the disc playback position and anti-vibration characteristics of the holder are thereby improved.

4 Claims, 8 Drawing Sheets

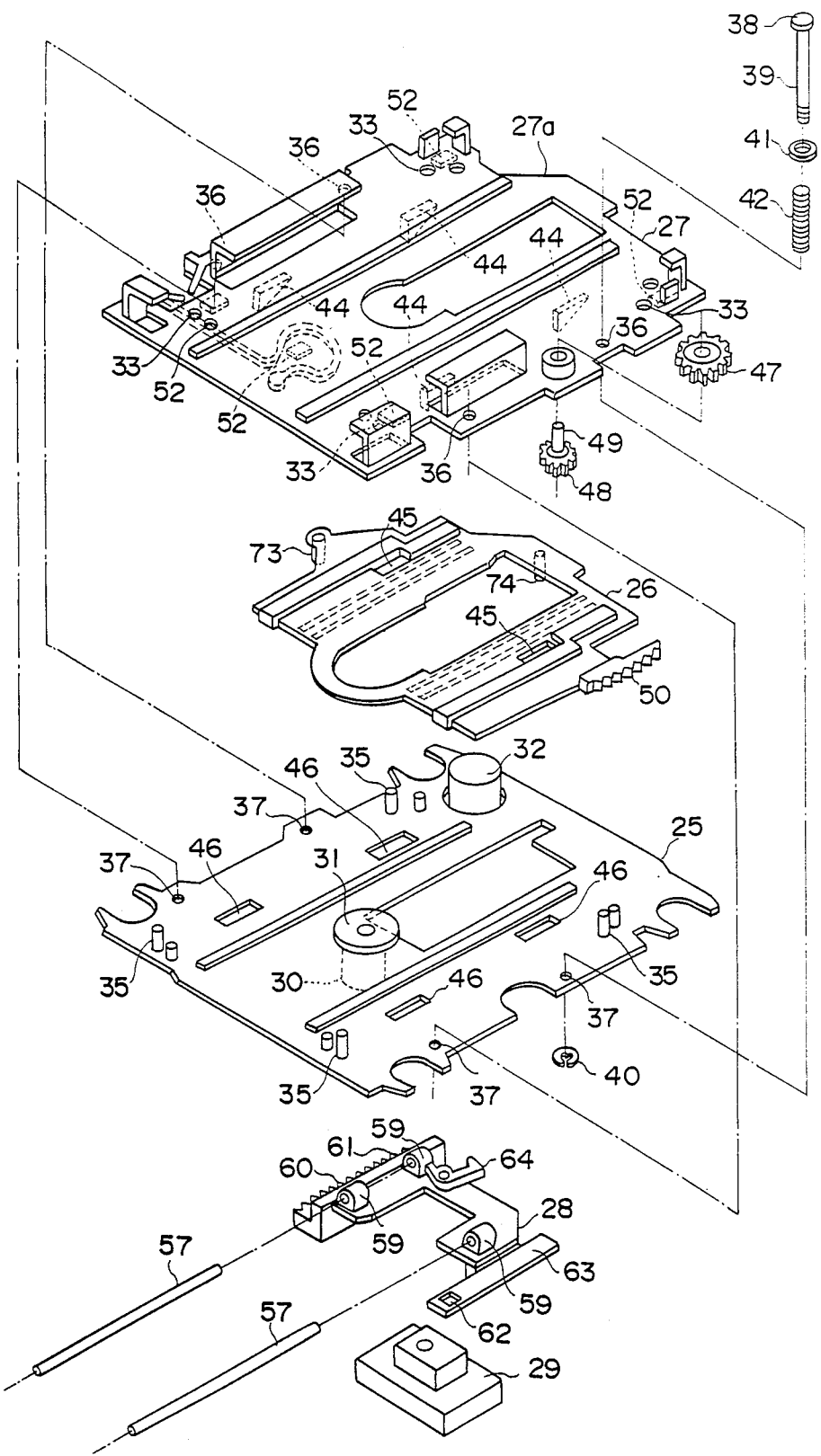
F I G. 4

CLAMPING DEVICE FOR A HOLDER OF A DISC PLAYBACK DEVICE

BACKGROUND OF THE INVENTION

This invention relates to a clamping device for a holder of a disc playback device of a type having a holder for holding a disc or a disc cartridge case receiving a disc and being capable of displacing the holder between a position in which the disc is not played back and a position in which the disc is played back and, more particularly, to a clamping device of such type being capable of accurately clamping the holder in position when the holder has been displaced to the disc playback position.

The applicant of the present invention has previously proposed a disc playback device for playing back a disc such as a disc for the Compact Disc Digital Audio System as shown in FIGS. 8 and 9 (the U.S. patent application Ser. No. 781,768) filed Sept. 30, 1985.

Referring to FIGS. 8 and 9, the proposed disc playback device consists of a disc cartridge case A and a main body B. A disc is housed in the disc cartridge case A and this disc cartridge case A is loaded in the main body B and the disc is played back in a state in which it is housed in the disc cartridge case A.

The disc cartridge case A is provided on one side thereof with a rack (not shown) for loading the case A in the main body B.

Above a chassis 1 of the main body B, there are provided a turntable 3 driven by a disc driving motor 2, a carrier 4 and a holder 5. Below the chassis 1, there is provided an optical pickup head device 6. The carrier 4 is movable in directions shown by arrows P1, P2 by an unillustrated drive source. The holder 5 which is provided for holding the disc cartridge case A is movable vertically along pins 7, 7 ... fixedly secured to the chassis 1 and is constantly urged downwardly by connection springs 8, 8 ... provided between the holder 5 and the chassis 1. In a state shown in FIG. 8, the holder 5 is in its elevated position with its cams 9, 9 ... formed on the lower surface thereof being in abutting contact with the upper surface of the carrier 4. As the carrier 4 is moved in the direction of arrow P1, the holder 5 is gradually moved downwardly by entering of the cams 9, 9 ... into openings (not shown) formed in the chassis 1. A loading pinion 10 is provided on the chassis 1 in such a manner that it is rotated in association with the movement of the carrier 4 and is brought into meshing engagement with the rack of the disc cartridge case A, causing this case A to move in the direction of arrows P1, P2.

For playing back a disc 11 by the main body B, the disc cartridge case A housing the disc 11 is manually inserted into a predetermined position in the direction of arrow P1 in the holder 5. At this time, the holder 5 is in the elevated position shown in FIG. 8. Upon detection of the insertion of the disc cartridge case A in the predetermined position in the holder 5, the carrier 4 starts its movement in the direction of arrow P1 by means of its driving system. This in turn causes the loading pinion 10 to be rotated and come into meshing engagement with the rack of the disc cartridge case A thereby causing the case A to be moved in the direction of arrow P1. As the disc cartridge case A is moved to a region above the turntable 3, the cams 9, 9 ... of the holder 5 gradually enter the openings of the carrier 4 and the chassis 1, and the holder 5 is moved downwardly by the urging force of the connection springs 8, 8 ... while holding the disc cartridge case A therein. As the holder 5 and the disc cartridge case A are moved downwardly, the turntable 3 enters in a relative movement into the disc cartridge case A through an opening (not shown) formed in the disc cartridge case A and the disc 11 housed in the case A thereby is mounted on the turntable 3. The drive source of the carrier 4 thereupon is stopped and the loading of the disc cartridge case A is completed. If a playback command is given to the main body B in this state, the disc driving motor 2 is started to rotate the turntable 3 with the disc 11 and the disc 11 is played back with the optical pickup head device 6 picking up signals recorded on the disc 11.

The disc playback device described above is constructed such that, when the holder 5 and the disc cartridge case A have been moved downwardly to the position in which the disc 11 can be played back, the force for clamping the holder 5 is obtained by the urging force of the connection springs 8, 8 ... In this construction, however, the connection springs 8, 8 ... which were initially in an expanded state become unexpanded when the holder 5 has been moved to its lowered position. This reduces the clamping force of the connection springs 8, 8 ... with a resulting insecurity in clamping of the holder 5. This gives rises to inconvenience such as an undesired vertical movement of the holder 5 due to vibrations occurring outside of the device. Thus, the above described disc playback device is not satisfactory in the antivibration characteristics of the holder 5. Besides, when the disc cartridge case A is loaded in or ejected from the main body B, the cams 9, 9 ... of the holder 5 are brought into abutting engagement with the carrier 4 in a state in which the connection springs 8, 8 ... are strongly pulled so that friction between the carrier 4 and the cams 9, 9 ... causes load of a large value to be imposed upon the drive source of the carrier 4.

SUMMARY OF THE INVENTION

It is, therefore, an object of the invention to provide a clamping device for the holder in the above described disc playback device realizing improved antivibration characteristic of the holder and reduction in the load applied to the drive source for the loading device.

According to the invention, the above object is achieved by providing magnetic attraction generating means which generates magnetic attraction between the holder and the chassis of the disc playback device when the holder has moved to a position in which the disc can be played back.

The magnetic attraction generating means is constructed by fixing a magnet on one of the chassis and the holder and forming the other with magnetic substance. Alternatively, the magnetic attraction generating means is constructed by fixedly securing a pair of magnets to both the chassis and the holder in such positions as to attract the chassis and the holder to each other.

In a preferred construction of the clamping device made according to the invention, a slight gap is formed between the pair of magnets or between the magnetic substance and the magnet attracting each other when the holder is in a position in which the disc can be played back.

According to the invention, the holder can be securely clamped in position during playing back of the disc whereby the anti-vibration characteristic of the disc playback device is remarkably improved. In a case where the disc playback device is so constructed that, as in the above described prior art device, the movement of the holder from the non-playback position to the playback position is effected by the urging force of the connection springs, it is not necessary to provide these connection springs with a function to clamp the holder and, accordingly, the urging force of these connection springs can be set to a relatively small value. This permits the holder to be moved in a vertical direction with a force of a relatively small value in ejecting the disc or the disc cartridge case whereby the load applied to the drive source of the holder is reduced.

A preferred embodiment of the invention will now be described with reference to the accompanying drawings.

BRIEF DESCRIPTION OF THE DRAWINGS

In the accompanying drawings,

FIGS. 1 through 7 show an embodiment of the invention in which;

FIG. 1 is a side view of the disc playback device with the holder clamping device of the invention;

FIG. 2 is a plan view of the same device;

FIG. 3 is a bottom view of the same device;

FIG. 4 is an exploded perspective view of the same device;

FIG. 5 is a sectional view taken along lines V—V in FIG. 3;

DESCRIPTION OF THE PREFERRED EMBODIMENT

FIGS. 1 through 8 show an embodiment of the invention applied to a playback device for a Compact Disc.

Figure 9:
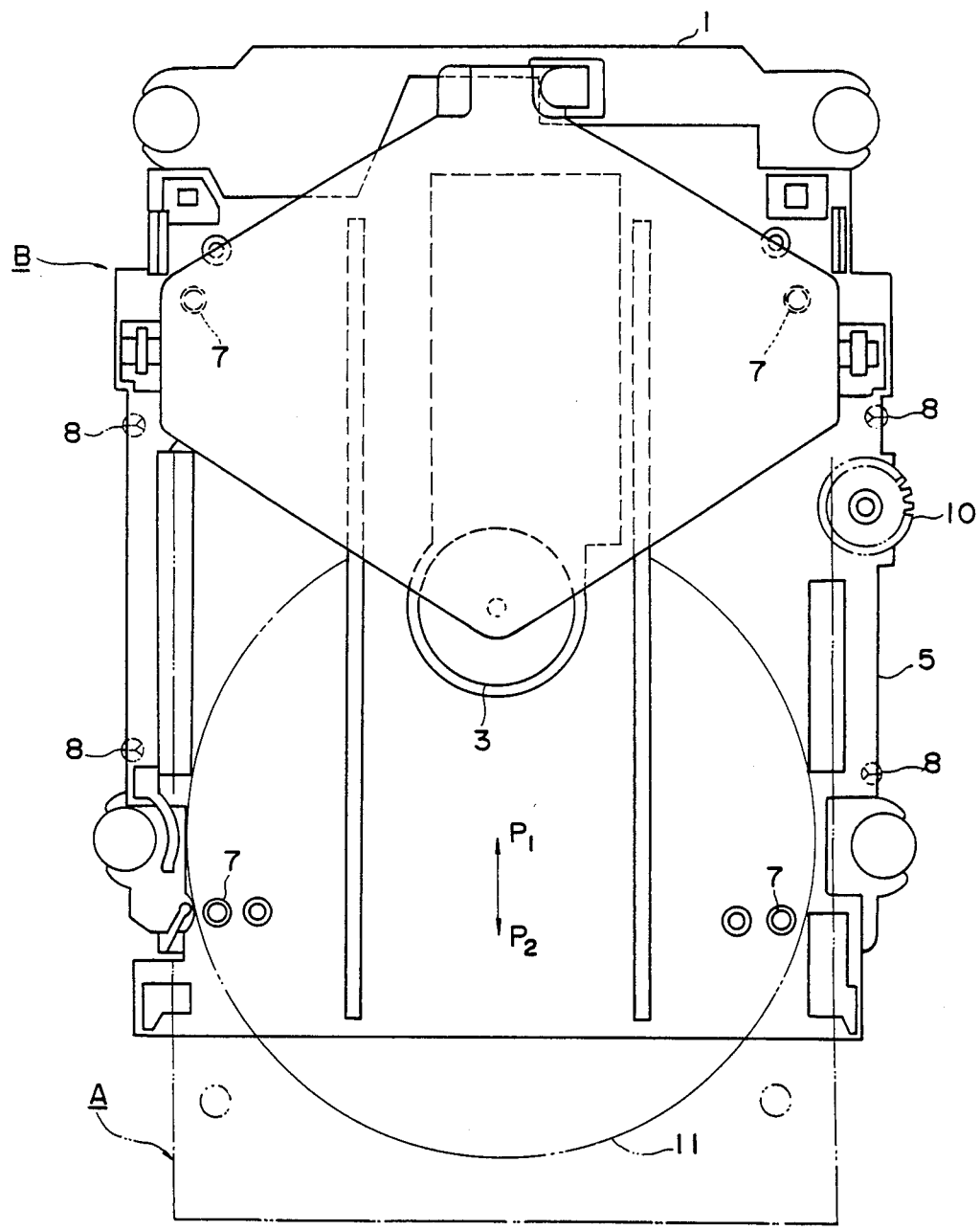
FIG. 9 is a plan view of the same prior art device.

The disc playback device (Compact Disc player) to be described below comprises a disc cartridge case C housing a disc (Compact Disc) and a main body D. As in the disc playback device shown in FIGS. 8 and 9, the disc is housed in the disc cartridge case C and this disc cartridge case C is loaded in the main body D and the disc is played back in a state in which it is housed in the disc cartridge case C.

Figure 2:
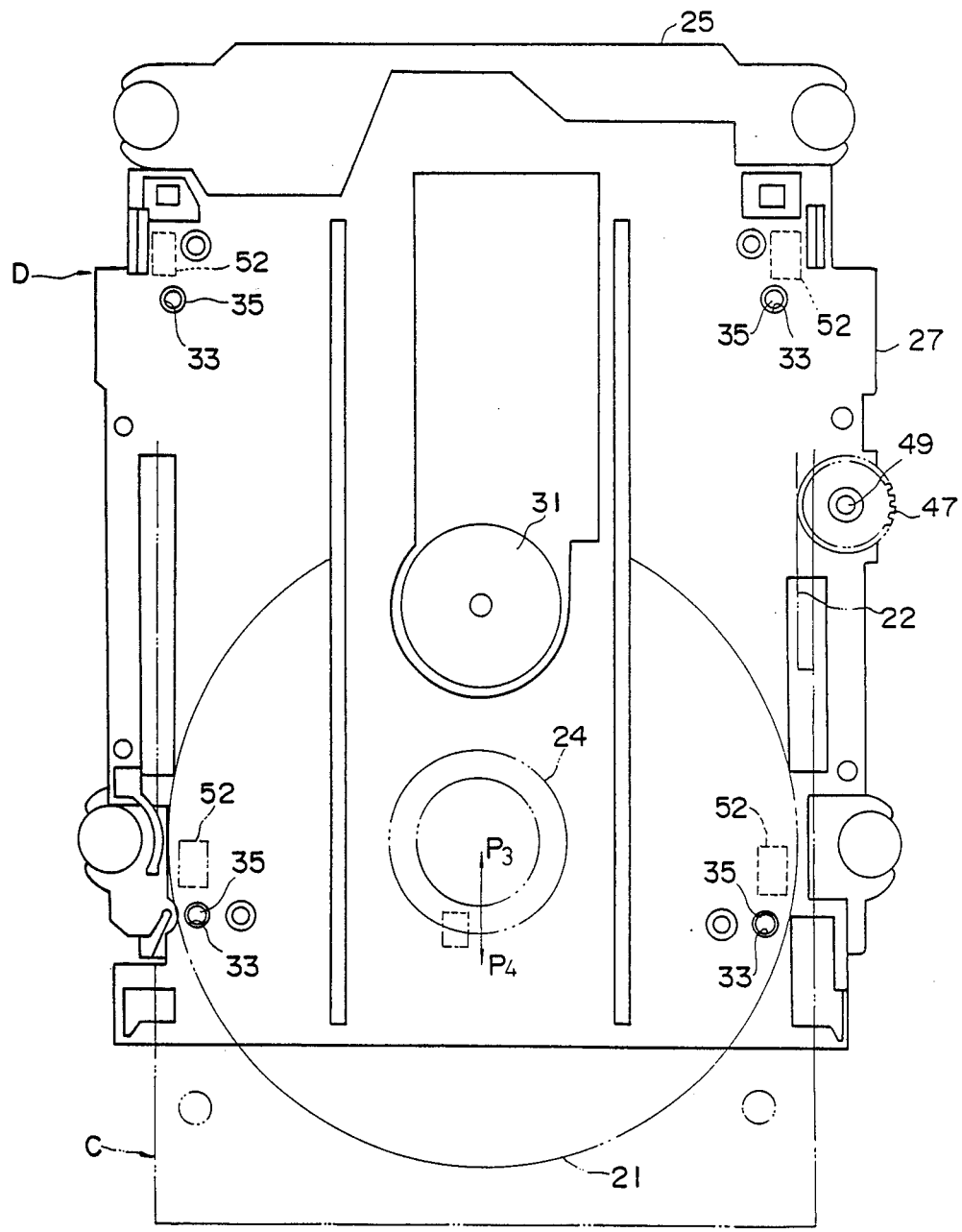

The disc cartridge case C houses a disc 21 rotatably therein. As shown in FIGS. 2 and 6, a rack 22 is provided on one side of the disc cartridge case C for loading the case C in the main body D and a disc stabilizer 24 is provided undetachably on the upper surface of the inside of the case C for rotatably holding the disc 21.

The construction of the main body D will now be described. Referring to FIGS. 1 through 4, above a chassis 25 there are provided a carrier 26 and a holder 27 and below the chassis 25, there is provided an optical pickup head 29.

A disc driving motor 30 is mounted on the lower surface of the chassis 25 and a turntable 31 is mounted on the rotation shaft of this motor 30 projecting upwardly through the chassis 25. On this turntable 31 is attached a magnetic substance or a magnet (not shown) which is attracted to a magnet or a magnetic substance (not shown) attached to the disc stabilizer 24 when the disc 21 has been mounted on the turntable 31, as will be described more fully later. A feed loading motor 32 is secured to one end portion of the chassis 25 in such a manner that its rotation shaft is projecting downwardly. The carrier 26 is disposed on the upper surface of chassis 25 and is movable in directions of arrows P3 and P4. The holder 27 is disposed above the upper surface of the chassis 25 with the carrier 26 disposed therebetween and is vertically movable relative to the chassis 25. The holder 27 is formed in the respective corners thereof with guide members 34, 34 . . . having location pin guide openings 33, 33 . . . as shown in FIGS. 1, 2, 4 and 7 by the outsert forming. Location pins 35, 35 . . . are fixedly secured to the respective corners of the chassis 25 with their upper end portions being inserted in the location pin guide openings 33, 33 . . . Owing to this structure, the holder 27 moves vertically along the location pins 35, 35 . . . The holder 27 is formed in its side edge portions with openings 36, 36 whereas the chassis 25 is formed in locations corresponding to these openings 36, 36 . . . with openings 37, 37 . . . Pins 39 having head portions 38 are inserted through the corresponding openings 36, 36 . . . and 37, 37 . . . Retainers 40 are attached to the end portions of these pins 39, 39 . . . projecting downwardly from the chassis 25 and washers 41 engaging with the head portions 38 are attached to the end portions of these pins 39, 39 . . . projecting upwardly from the chassis 25. Coil springs 42 are provided between the washers 41 and the holder 27, urging the holder 27 downwardly. The holder 27 is in its uppermost position when cams 44, 44 . . . formed on the lower surface of the holder 27 are in abutting engagement with the upper surface of the carrier 26 and is moved downwardly by the urging force of the coil springs 42, 42 . . . when the cams 44, 44 . . . have entered openings 45, 45 . . . formed in the carrier 26 and openings 46, 46 . . . formed in the chassis 25. A shaft 49 to which a loading pinion 47 and a carrier pinion 48 are fixedly secured is rotatably supported on the holder 27. The carrier pinion 48 is in mesh with a rack 50 provided on the carrier 26.

In the above described construction, when the head base 28 has been moved as will be described later, the carrier 26 is moved in association with this head base 28 in the directions of arrows P3 and P4 thereby causing the holder 27 to be moved upwardly and downwardly and the loading pinion 47 to be rotated. During the playback of the disc 21, the holder 27 holds the disc cartridge case C housing the disc 21 and places the disc 21 on the turntable 31. During loading and ejecting of the disc cartridge case C, the loading pinion 47 meshes with the rack 22 of the disc cartridge case C and thereby moves the disc cartridge case C in the directions of arrows P3 and P4.

The chassis 25 and the holder 27 are formed by cutting steel plates which are magnetic substance to predetermined shapes.

Figure 7A:
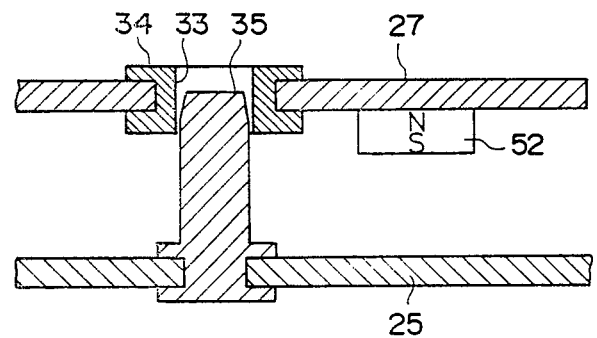
FIGS. 7a and 7b are sectional views of a part of the same device schematically showing the operation thereof.
Figure 7B:
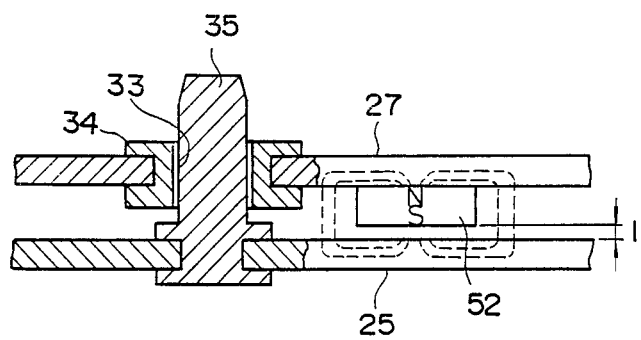
Figure 8:
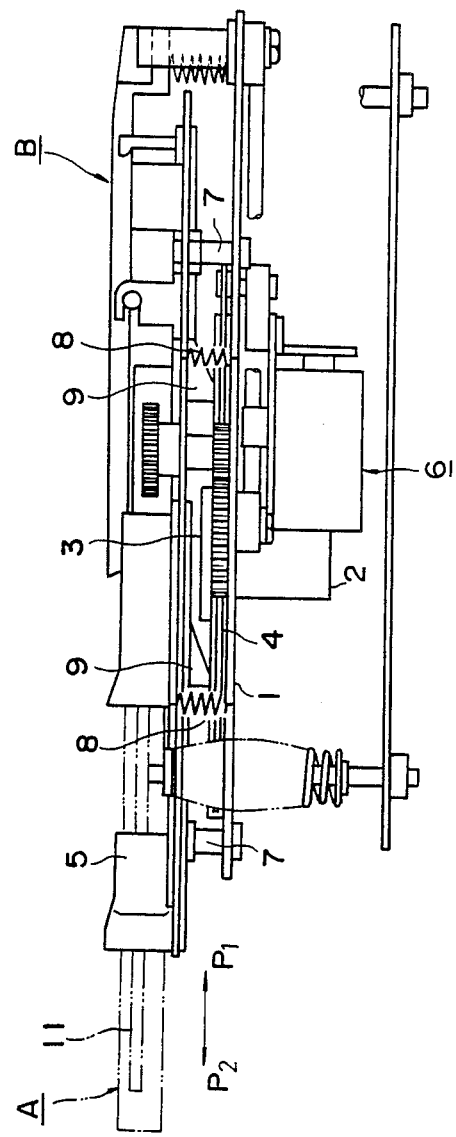
FIG. 8 is a side view of the prior art disc playback device.

Magnetic attraction generating means is provided on the chassis 25 and the holder 27 for clamping the holder 27 in position in association with the coil springs 42, 42 . . . when the holder 27 holding the disc cartridge case C has been moved downwardly to a position in which the holder 27 enables the disc 21 to be played back. More specifically, magnets 52, 52 . . . in the form of an oblong plates are bonded by adhesive on the lower surface of the holder 27 in respective corners and in the front end portion. Each of the magnets 52 is magnetized so that it has poles in the upper and lower end portions thereof as shown in FIG. 7. The portions of the chassis 25 opposing these magnets 52, 52 . . . are formed in flat surfaces so that these portions of the chassis 25 are attractable to the magnets 52, 52 . . . FIG. 7a shows a state in which the holder 27 is in its uppermost position whereas FIG. 7b shows a state in which the holder 27 is in its lowermost position in which the disc 21 can be played back (i.e., a position in which the cams 44, 44 . . . of the holder 27 have entered the openings 45, 45 . . . of the carrier 26 and the openings 46, 46 . . . of the chassis 25 and a plate portion 27a is in abutting engagement with the upper surface of the carrier 26). When the holder 27 is in the lowermost position shown in FIG. 7b, flux of each of the magnets 52 passes from the magnet 52 to the chassis 25 through the holder 27 and returns from the chassis 25 to the magnet 52. By the formation of this magnetic circuit, the magnets 52 attract the chassis 25 thereby clamping the holder 27 in position securely and preventing an undesired vertical movement of the holder 27. In this lowermost position of the holder 27, a small gap l is defined between the magnets 52 and the chassis 25 so as to enable the holder 27 to move easily when it is displaced from the chassis 25.

Figure 1:
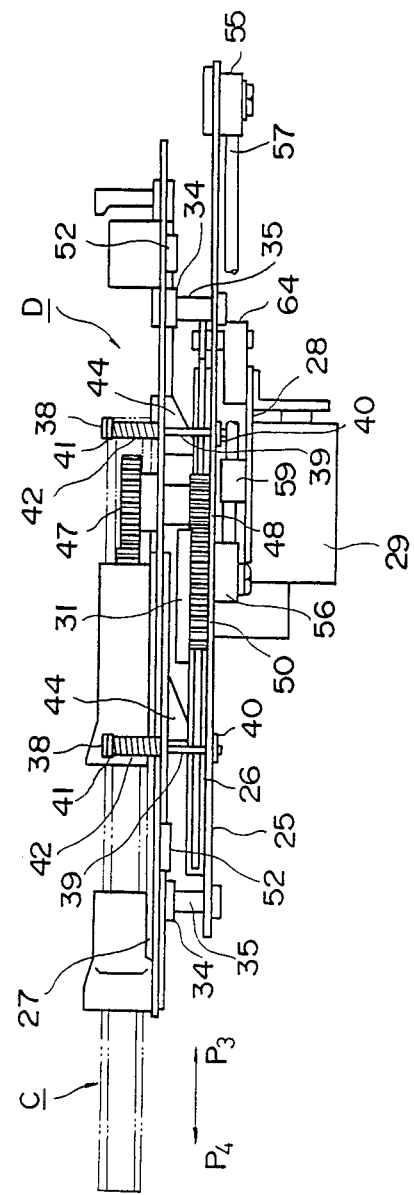
Figure 3:
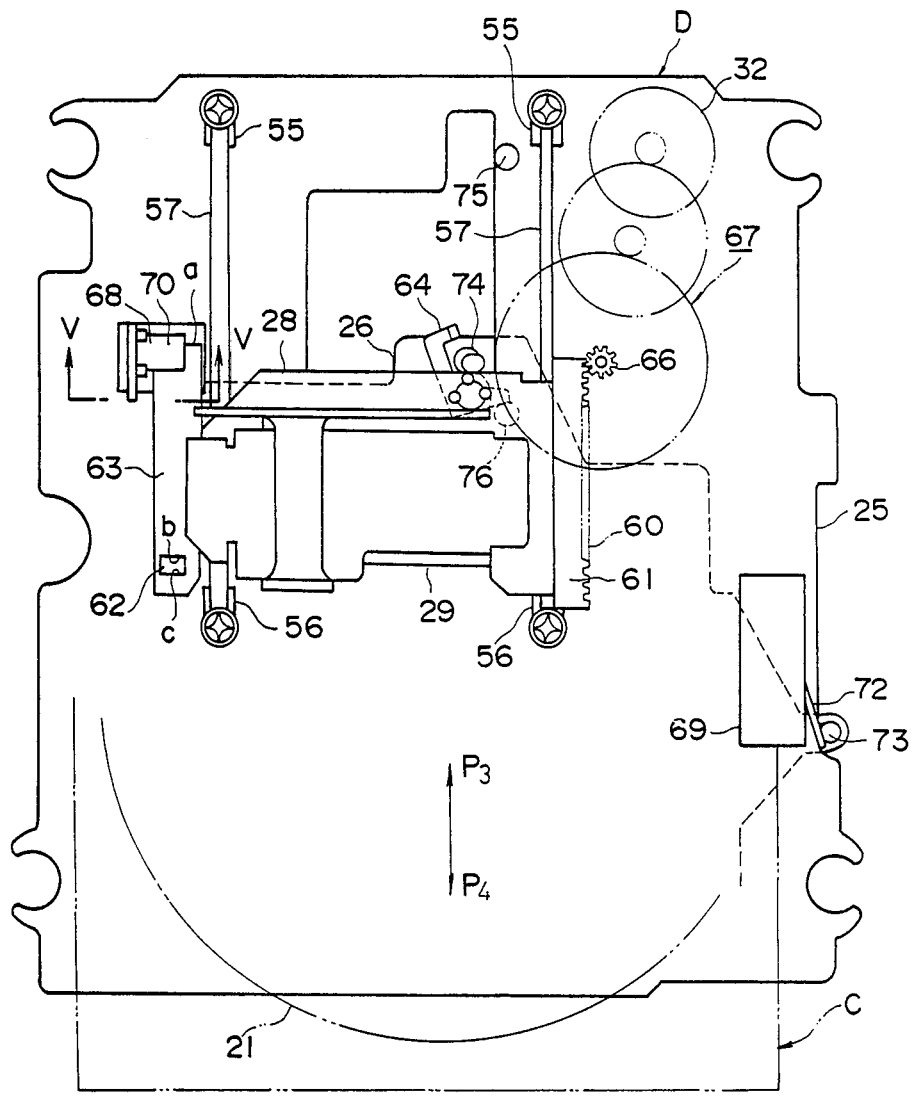
Figure 5:
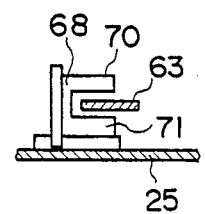

As shown in FIGS. 1 and 3, guide bar mounting blocks 55, 55, 56, 56 are provided on the lower surface of the chassis 25 and guide bars 57, 57 are mounted between the guide bar mounting blocks 55 and 56 in a direction parallel to the directions of arrows P3 and P4. The head base 28 is mounted on the guide bars movably in the directions of arrows P3 and P4. As shown in FIGS. 3 and 4, the head base 28 is provided in its left and right upper surface portions with mounting blocks 59, 59, 59, in its one side portion with a member 61 having a feed loading rack 60, in its other side portion with a slit plate 63 having an opening 62, in one end portion of its upper surface with an engaging hook 64 and in its central portion with the pickup head 29. On the lower surface of the chassis 25, there are provided a feed loading pinion 66 which meshes with the feed loading rack 60 of the head base 28, a gear train 67 for transmitting the rotation of the feed loading motor 32 to the pinion 66, a photo-coupler 68 for detecting the position of the head base 28 and a microswitch 69 for detecting insertion of the disc cartridge case C in the holder 27. The photo-coupler 68 is disposed in such a manner that, as shown in FIGS. 3 and 5, its light-emitting section 70 and its light-receiving section 71 are opposed to each other with the slit plate 63 being interposed therebetween. This photo-coupler 68 detects the position of the head base 28 by detecting passing or interruption of light between the light-emitting section 70 and the light-receiving section 71 when the rear edge a of the slit plate 63 and edges b and c of the opening 62 have been moved to the space between these sections 70 and 71. The photo-coupler 68 thereby detects the lead-in and lead-out positions of the disc 21, completion of the loading operation and completion of the overstroke movement of the head base 28 to be described later. The microswitch 69 is so constructed that its actuator 72 abuts against a pin 73 provided on the carrier 26 and detects disengagement of the pin 73 from the actuator 72 thereby detecting the insertion of the disc cartridge case C in the holder 27.

In the above described construction, when the feed loading pinion 66 is driven and rotated, the head base 28 whose rack 60 is in mesh with the pinion 66 is moved in the directions of P3 and P4 and the optical pickup head 29 thereby is moved in the diametrical direction of the disc 21 in a region beneath the disc 21 placed on the turntable 31. At this time, the carrier 26 is moved in the direction of arrow P3 or P4 by abutting engagement of a carrier pin 74 fixedly secured on the carrier 26 with the head base 28 or engagement of the carrier pin 74 with the engaging hook 64. When the head base 28 has been moved in the direction of arrow P3 or P4, an end portion of the engaging hook 64 is engaged with a pin 75 or 76 fixedly secured on the chassis 25 in the end sections of the movements of the head base 28 and the engaging hook thereby is rotated into engagement with or disengagement from the carrier pin 74.

The operation of the disc playback device during playback of the disc will now be described.

Figure 6A:
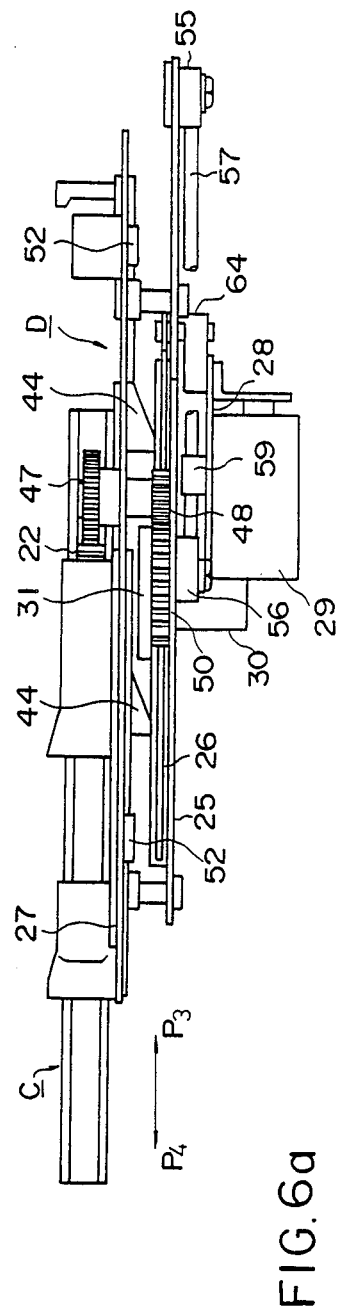
FIGS. 6a, 6b and 6c are side views of the same device illustrating different states of operation of the device.

In a standby state before the disc cartridge case C is inserted, the main body D is in a state shown in FIG. 6a in which the carrier 26 has moved in the direction of arrow P4 and the holder 27 is in its uppermost position (the non-playback position of the disc 21) with the lower edges of the cams 44, 44 . . . being in abutting engagement with the upper surface of the carrier 26. The head base 28 also is in a position in which it has moved to the direction of arrow P4. The pin 73 of the carrier 26 is in abutting engagement with the actuator 72 of the microswitch 69. The carrier pinion 48 is in mesh with the rack 50.

For playing back the disc 21, the disc 21 is loaded in the disc cartridge case C and this disc cartridge case C is manually inserted into the holder 27 of the main body D. In this manual operation, the disc cartridge case C is inserted in the direction of arrow P3 as shown in FIG. 6a to a position in which the foremost end portion of the rack 22 of the case C comes into meshing engagement with the loading pinion 47 and this loading pinion 47 thereby is slightly rotated. The slight rotation of the loading pinion 47 is transmitted to the carrier pinion 48 through the shaft 49 and the rack 50 which is in mesh with the carrier pinion 48 is moved in the direction of arrow P3 thereby causing the carrier 26 to be moved by a small distance in the same direction. This movement of the carrier 26 causes the pin 73 to be disengaged from the actuator 72 of the microswitch 69 shown in FIG. 3 whereby the microswitch 69 is turned on.

Figure 6B:
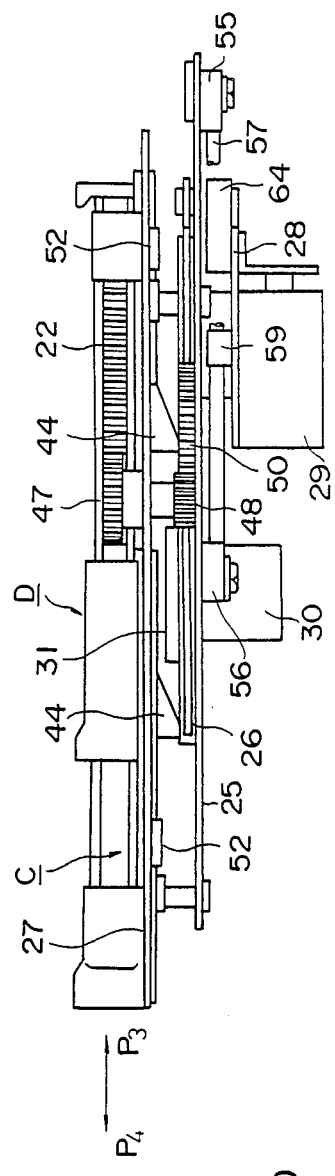
Figure 6C:
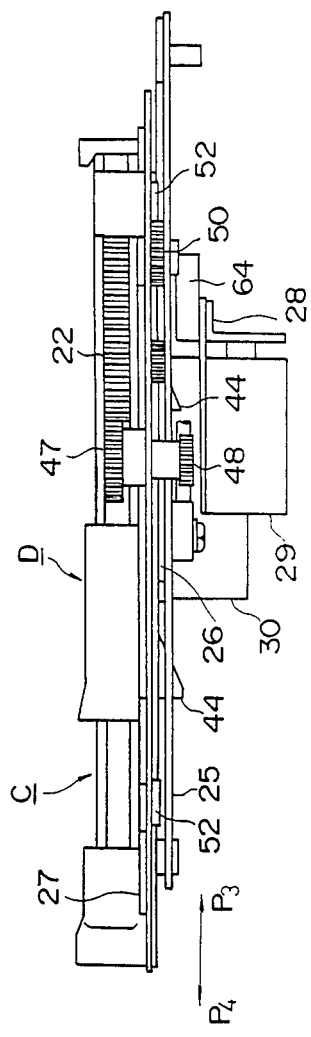

As the microswitch 69 is turned on, the feed loading motor 32 is switched on through an operation of an unillustrated control circuit and the rotation of the feed loading motor 32 is transmitted to the feed loading pinion 66 through the gear train 67. The rotation of the pinion 66 causes the feed loading rack 60 which is in mesh with the pinion 66 to be moved in the direction of arrow P3 and the head base 28 thereby is moved in the same direction. The movement of the head base 28 in the direction of arrow P3 causes the rear edge of the head base 28 to push the carrier pin 74 in the direction of arrow P3 thereby moving the carrier 26 is moved in the of arrow P3. As the carrier 26 is moved in the direction of arrow P3, the carrier pinion 48 which is in mesh with the rack 50 is rotated and the loading pinion 47 is simultaneously rotated. The rotation of the loding pinion 47 causes the disc cartridge case C to be moved in the direction of arrow P3 as shown in FIG. 6b. As the disc cartridge case C is moved and the disc 21 housed therein approaches the region above the turntable 31, the cams 44, 44 . . . of the holder 27 gradually enter the openings 45, 45 . . . of the carrier 26 and the openings 46, 46 . . . of the chassis 25 and the holder 27 thereby is moved downwardly. As the holder 27 is moved downwardly, the turntable 31 enters in a relative movement into the disc cartridge case C through an opening (not shown) formed in the disc cartridges case C and holds the disc 21 housed in the case C. At this time, the disc 21 is disposed in a space between the disc stabilizer 24 of the case C located above the central portion of the disc 21 and the turntable 31 located beneath the central portion of the disc 21 and is held securely between the disc stabilizer 24 and the turntable 31 with the aid of magnetic attraction between the magnet mounted on the turntable 31 and the disc stabilizer 24 of magnetic substance. When the holder 27 has reached its lowermost position (the playback position of the disc 21) as shown in FIG. 6c, the carrier pinion 48 is disengaged from the rack 50 and the rotation of the loading pinion 47 thereby is stopped.

In the above operation, the holder 27 having reached its lowermost position is held in position by the coil springs 42, 42 . . . in association with the magnetic attraction generating means. More specifically, the holder 27 is held on the carrier 26 by the urging force of the coil springs 42, 42 . . . In addition, the magnets 52, 52 . . . fixedly secured to the holder 27 attract the chassis 25 by the formation of the magnetic circuit through the magnets 52, the holder 27 and the chassis 25 as shown in FIG. 7b thereby holding the holder 27 in position. Thus, the holder 27 is clamped in its lowermost position by the coil springs 42, 42 . . . and the magnetic attraction generating means. In particular, the magnetic attraction increases in inverse proportion to the square of relative distance so that the magnetic attraction generating means imparts a sufficient force to clamp the holder 27 and effectively prevents an undesired vertical movement of the holder 27 even when vibration is applied from the outside of the device.

When the loading operation of the disc cartridge case C has been completed, the head base 28 is moved to the rear end portions of the guide bars 57, 57. At this time, the photo-coupler 68 detects passing of the side edge b of the opening 62 formed in the slit plate 63 and thereby detects completion of the loading operation. Upon detection of the completion of the loading operation by the photo-coupler 68, the motor 32 is reversely rotated and the head base 28 starts movement in the direction of arrow P4. Since the head base 28 is not engaged with the carrier 26 at this time, the carrier 26 is not moved in association with the head base 28. The head base 28 only is moved and the optical pickup head 29 reaches the lead-in position of the disc 21. Thereupon the photo-coupler 68 detects passing of the rear edge a of the slit plate 63 and the motor 32 thereby is stopped and the head base 28 stops its movement.

The disc playback device is now in a state in which the disc 21 can be played back. When a playback command is given to the device, the disc driving motor 30 is rotated to turn the disc 21 with the turntable 31. In the meanwhile, the feed loading motor 32 which provides driving force for the feed operation causes the head base 28 to start to move in the direction of arrow P3. A signal reading section of the optical pickup head 29 on the head base 28 reads a signal recorded on the disc 21 through a laser beam inlet (not shown) formed in the disc cartridge case C whereby the playback of the disc 21 is performed.

When the signal reading section of the optical pickup head 29 has read a lead-out position signal recorded on the disc 21, or the photo-coupler 68 has detected passing of the edge b of the opening 62 formed in the slit plate 63, or an eject command has been given to the device, the feed loading motor 32 causes the head base 28 to move further in the direction of arrow P3 in an overstroke movement. In the course of the overstroke movement of the head base 28 in the direction of P3, the engaging hook 64 mounted on this head base 28 comes into abutting engagement with the pin 75 on the chassis 25 and is pushed and rotated by the pin 75 into engagement with the carrier pin 74 of the carrier 26. When the head base 28 has further moved to an end position of the overstroke movement, the photocoupler 68 detects passing of the edge c of the slit plate 63. Upon detection by the photo-coupler 68 of the end position of the overstroke movement of the head base 28, the feed loading motor 32 is reversely rotated and the head base 28 is moved in the direction of arrow P4 with the carrier 26 hooked by the engaging hook 64. Thus, the disc cartridge case C is returned to its initial position in the reverse order to the loading operation. In the vicinity of the end point of the reverse movement, the engaging hook 64 abuts against the pin 76 on the chassis 25 and is pushed and rotated thereby into disengagement from the carrier pin 74 of the carrier 26. In the end point of the reverse movement, the pin 73 of the carrier 26 engages with the actuator 72 of the microswitch 69. Thus, all component parts of the device are returned to their initial state whereby the eject operation is completed.

In the upward movement of the holder 27 during the eject operation also, the magnetic attraction clamping the holder 27 decreases in inverse proportion to the square of relative distance and, accordingly, once the holder 27 starts to move away from the chassis 25, the holder 27 can subsequently be released readily from the chassis 25.

In the above described embodiment, the magnetic attraction generating means is constructed by fixedly securing a magnet to the holder side and forming the chassis with magnetic substance. Alternatively, a magnet may be fixedly secured to the chassis 25 and the holder may be formed with magnetic substance. Alternatively, further, magnets may be fixedly secured to both the holder and the chassis so as to attract these magnets to each other.

In the above described embodiment, a gap of a predetermined distance is defined between the magnet and the chassis when the holder is in the playback position of the disc. If, however, the holder can be released easily from the chassis during the eject operation, the device may be constructed in such a manner that the magnet is attracted in direct contact to the chassis without the gap therebetween.

What is claimed is:

1. A clamping device for a holder of a disc playback device comprising:
   a chassis;
   a disc motor supported on the chassis and having a rotatable motor shaft;
   a turntable attached to the motor shaft, said turntable for supporting a disc during playback;
   a holder for carrying a disc or a disc cartridge case housing a disc, the holder being movable with respect to the chassis and being supported with respect to the turntable in such a manner that the holder is movable between a position in which the disc is spaced from the turntable and cannot be played back and a position in which the disc is supported on the turntable and can be played back; and magnetic attraction generating means for magnetically attracting the holder and the chassis to each other when the holder has moved to the position in which the disc can be played back so as to prevent relative movement of the holder with respect to the chassis during disc playback.

2. A clamping device as defined in claim 1 wherein said magnetic attraction generating means is constructed by fixedly securing a magnet to one of the chassis and the holder and forming the other with magnetic substance.

3. A clamping device as defined in claim 2 wherein a small gap is defined between the magnet and the magnetic substance when the holder has moved to the position in which the disc can be played back.

4. A clamping device as defined in claim 1 wherein said magnetic attraction generating means is constructed by fixedly securing magnets to both the chassis and the holder, the chassis and the holder attracting each other.

* * * * *